(12) United States Patent
Kinnaird et al.

(10) Patent No.: US 10,876,454 B2
(45) Date of Patent: Dec. 29, 2020

(54) AUTOMOTIVE EXHAUST AFTERTREATMENT SYSTEM WITH MULTI-REDUCTANT INJECTION AND DOSER CONTROLS

(71) Applicant: Faurecia Emissions Control Technologies, USA, LLC, Columbus, IN (US)

(72) Inventors: Edward Kinnaird, Columbus, IN (US); John Rohde, Columbus, IN (US); Robin Willats, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 64 days.

(21) Appl. No.: 16/184,567

(22) Filed: Nov. 8, 2018

(65) Prior Publication Data

US 2020/0149451 A1    May 14, 2020

(51) Int. Cl.
*F01N 3/20*    (2006.01)
*F01N 11/00*   (2006.01)
*B01D 53/94*   (2006.01)

(52) U.S. Cl.
CPC ......... *F01N 3/208* (2013.01); *B01D 53/9418* (2013.01); *B01D 53/9431* (2013.01); *F01N 11/002* (2013.01); *F01N 11/007* (2013.01); *F01N 2550/02* (2013.01); *F01N 2610/02* (2013.01); *F01N 2900/1402* (2013.01); *F01N 2900/1404* (2013.01); *F01N 2900/1406* (2013.01)

(58) Field of Classification Search
CPC ...... F01N 3/208; F01N 3/2066; F01N 11/002; F01N 11/007; F01N 2550/02; F01N 2610/02; F01N 2900/1402; F01N 2900/1404; F01N 2900/1406; B01D 53/9418; B01D 53/9431; Y02T 10/24
USPC .......................... 60/277, 286, 295, 299–301
See application file for complete search history.

(56) References Cited

U.S. PATENT DOCUMENTS

| | | |
|---|---|---|
| 4,486,270 A | 12/1984 | Kaasenbrood |
| 5,240,688 A | 8/1993 | Von Harpe |
| 5,827,490 A | 10/1998 | Jones |
| 6,077,491 A | 6/2000 | Cooper |

(Continued)

FOREIGN PATENT DOCUMENTS

| | | |
|---|---|---|
| CH | 707551 | 8/2014 |
| CN | 104265422 | 1/2015 |

(Continued)

OTHER PUBLICATIONS

Extended European Search Report for European Appl. No. 19207724.6, dated Feb. 26, 2020, 8 pages.

(Continued)

*Primary Examiner* — Thai Ba Trieu
*Assistant Examiner* — Dapinder Singh
(74) *Attorney, Agent, or Firm* — Barnes & Thornburg LLP

(57) ABSTRACT

An automotive exhaust aftertreatment system for reducing effluents, such as nitrous oxides (NOx), in exhaust gasses passing through the system. The automotive exhaust aftertreatment system includes a dosing unit configured to inject primary and secondary reductant fluids into exhaust gasses based on various strategies to optimize operation of the system.

15 Claims, 3 Drawing Sheets

(56) References Cited

U.S. PATENT DOCUMENTS

Figure 1:
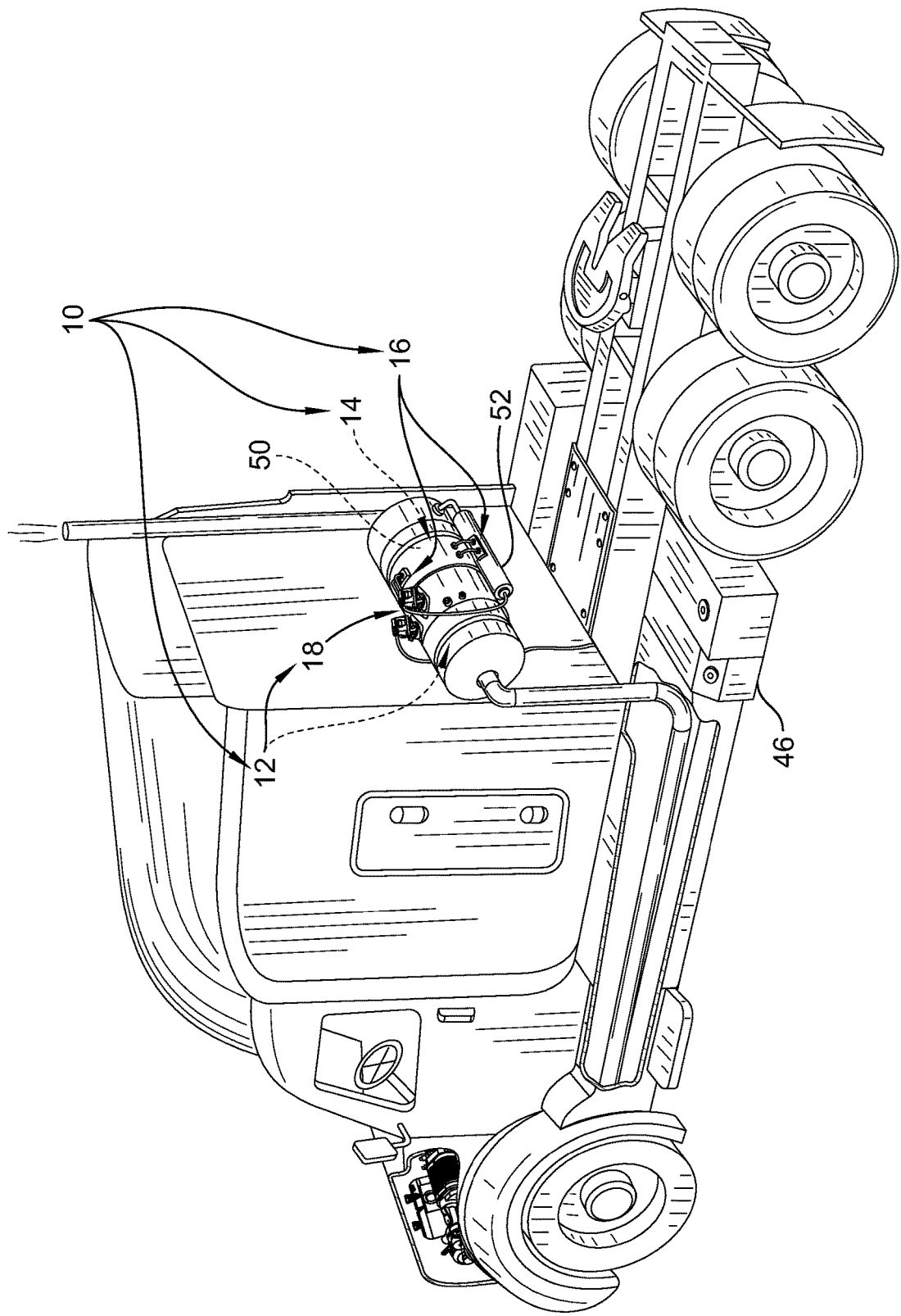

| | | |
|---|---|---|
| 7,449,162 B2 | 11/2008 | Schaller |
| 7,595,034 B2 | 9/2009 | Nissinen |
| 8,518,354 B2 | 8/2013 | Ayyappan |
| 9,598,977 B2 | 3/2017 | Meyer |
| 9,771,850 B2 | 9/2017 | Henry |
| 2009/0031713 A1 | 2/2009 | Suzuki |
| 2014/0363358 A1 | 12/2014 | Udd |
| 2015/0315950 A1* | 11/2015 | Hagimoto ............... F01N 3/023 73/114.75 |
| 2016/0061083 A1 | 3/2016 | Pramas |
| 2017/0204762 A1 | 7/2017 | Kotrba |

FOREIGN PATENT DOCUMENTS

| | | |
|---|---|---|
| DE | 102017101310 | 8/2017 |
| EP | 2543837 | 1/2013 |
| EP | 2870331 | 5/2015 |
| EP | 3330222 | 6/2018 |
| GB | 2552040 | 1/2018 |
| GB | 2562178 | 11/2018 |
| JP | 2015078643 | 4/2015 |
| KR | 20170013687 | 2/2017 |
| WO | 199956858 | 11/1999 |
| WO | 2006087553 | 8/2006 |
| WO | 2008077587 | 7/2008 |
| WO | 2013036308 | 3/2013 |
| WO | 2018075061 | 4/2018 |
| WO | 2018100187 | 6/2018 |

OTHER PUBLICATIONS

Extended European Search Report for European Appl. No. 19203355.3, dated Feb. 26, 2020, 9 pages.

Zhanfeng Qi, Shusen Li, Xiuli Guo, "Development, Application and Direction of Development of Urea-SCR", International Journal of Multimedia and Ubiquitous Engineering, 2016, pp. 131-142, vol. 11, Issue No. 2016.

Tue Johannessen, "Compact ammonia storage systems for fuel-efficient NOX emissions reduction", CTI mnference on SCR Systems, Jul. 5, 2010.

Anu Solla, Marten Westerholm, Christer Soderstrom, Kauko Tormonen, "Effect of Ammonium Formate and Mixtures of Urea and Ammonium Formate on Low Temperature Activity of SCR Systems", SAE International, 2005.

Daniel Peitz, "Investigations on the catalytic decomposition of guanidinium formate, ammonium formate and methanamide as NH3-precuresors for the selective catalytic reduction of NOX", Univeristy of Erlangen-Nuremberg, 2010.

* cited by examiner

AUTOMOTIVE EXHAUST AFTERTREATMENT SYSTEM WITH MULTI-REDUCTANT INJECTION AND DOSER CONTROLS

BACKGROUND

The present disclosure relates to exhaust aftertreatment systems for automotive applications, and particularly to the incorporation of onboard ammonia creation to support direct injection into an exhaust gas stream.

SUMMARY

An automotive exhaust aftertreatment system including an onboard ammonia reactor is described in this paper. The aftertreatment system is configured to mix urea-water solution and/or aqueous ammonium carbamate solution provided by the ammonia reactor as reducing agents with exhaust gas moving through the system. The mixing of these reducing agents with exhaust gas is designed to cause a chemical reaction and reduce nitrous oxides (NOx) in the exhaust gas.

In illustrative embodiments, the system includes a doser unit that is configured to inject reducing agents into engine exhaust gas to cause chemical conversion of nitrous oxides in the engine exhaust into nitrogen and water vapor or carbon dioxides. More specifically, the doser unit is configured to discharge either urea-water solution, also known as diesel emission fluid (DEF or AdBlue), and/or aqueous ammonium carbamate solution into the engine exhaust stream moving through the exhaust aftertreatment system.

In illustrative embodiments, the doser unit includes first/second dosers and a doser controller. The first/second dosers are configured to discharge controlled amounts of urea-water solution and/or aqueous ammonium carbamate solution into the exhaust gas stream. The doser controller manages operation of the dosers and is configured to feed urea-water solution and/or aqueous ammonium carbamate solution into the exhaust stream via the dosers based on temperature data, back pressure data, or NOx level conversion data.

In the illustrative embodiment, a plurality of sensors used with the doser controller may include temperature sensors, pressure sensors, and/or nitrous oxide sensors. Each of the sensors are located in/along the exhaust stream and are configured to measure data related to temperature, pressure, or nitrous oxide levels.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
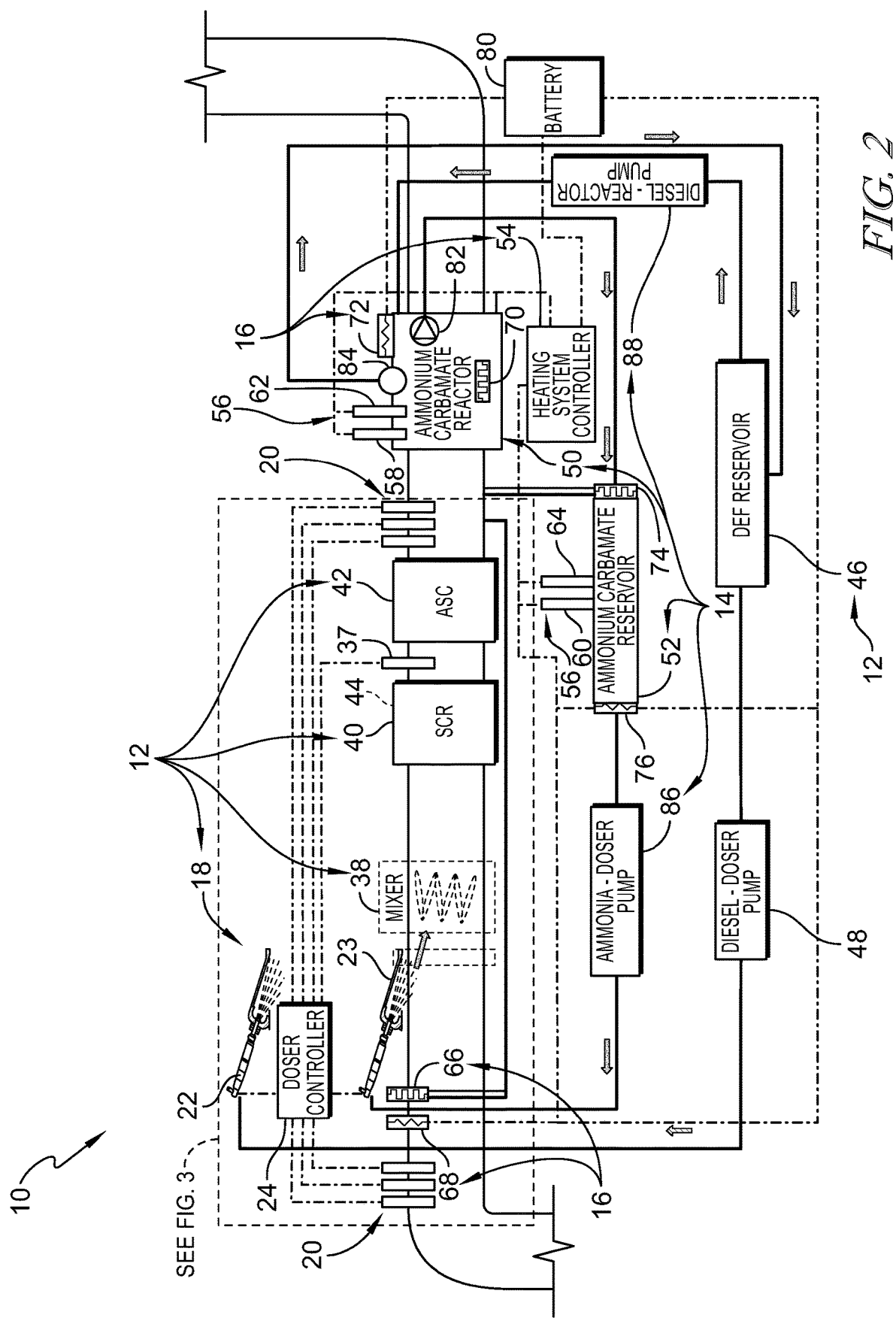
Figure 3:
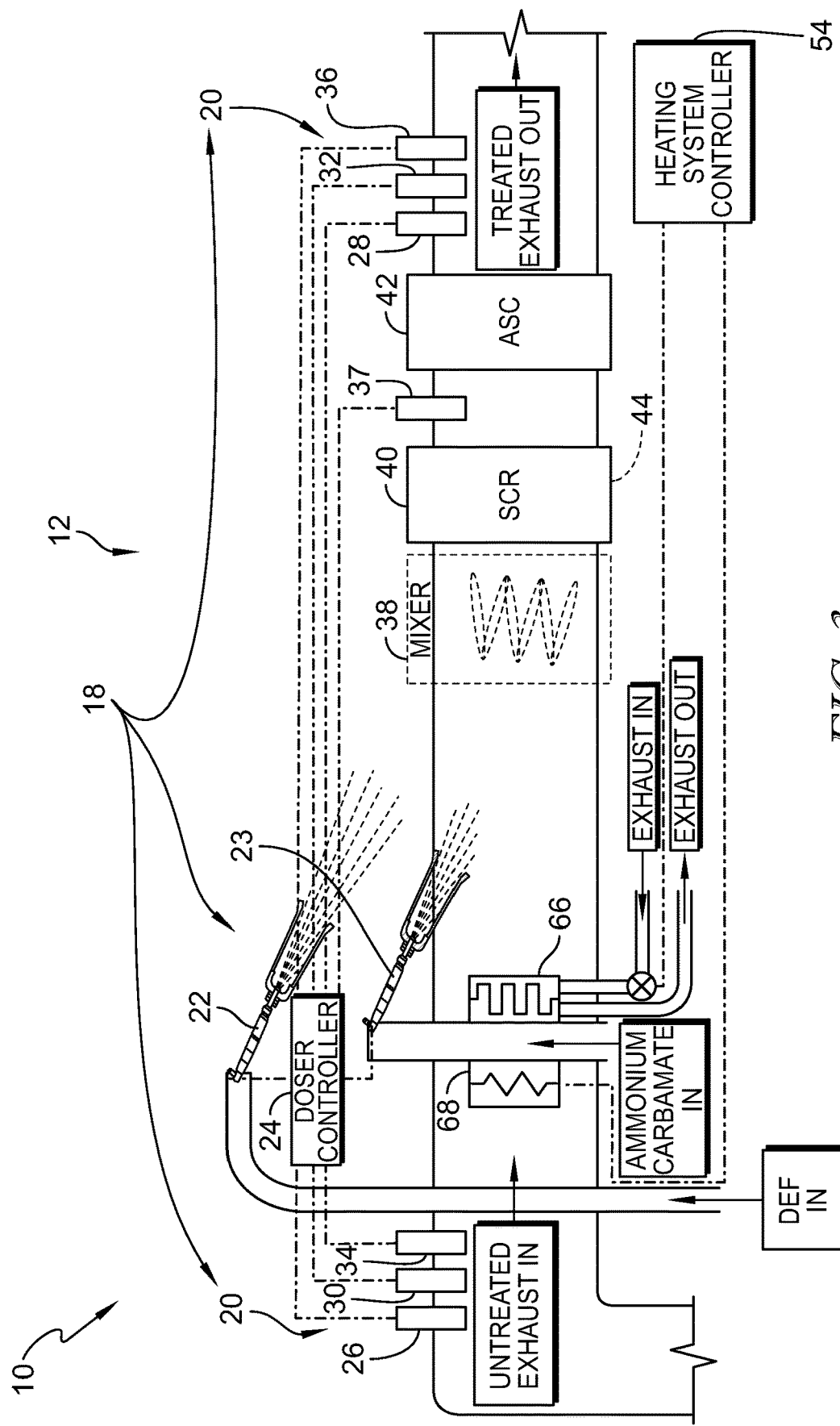

The detailed description particularly refers to the accompanying figures in which:

FIG. 1 is perspective view of a diesel engine semi-truck with an automotive exhaust aftertreatment system for mixing reductant(s) with exhaust gasses and causing a chemical reaction between the reductant(s) and nitrous oxides, NOx, in the exhaust gasses so that the amount of NOx in the exhaust gasses is reduced before discharge to the environment;

FIG. 2 is a diagrammatic view of the automotive exhaust aftertreatment system of FIG. 1 showing that the system includes a DEF reservoir for holding a primary reductant fluid (urea-water solution) to be mixed with exhaust gas in the system, an ammonia creation and conversion unit for generating a secondary reductant fluid (aqueous ammonium carbamate solution) to be mixed with exhaust gas in the system, and a catalytic NOx reduction unit for introducing primary/secondary reducing agents into an exhaust stream moving through the system; and FIG. 3 is a detail diagrammatic view of the doser unit included in the automotive exhaust aftertreatment system of FIG. 2 showing that the doser unit includes a doser controller configured to control dosers that feed either urea-water solution or aqueous ammonium carbamate solution based predetermined thresholds informed measured data from the plurality of sensors.

DETAILED DESCRIPTION

For the purposes of promoting an understanding of the principles of the disclosure, reference will now be made to a number of illustrative embodiments illustrated in the drawings and specific language will be used to describe the same.

An illustrative diesel engine semi-truck is shown in FIG. 1 having an automotive exhaust aftertreatment system 10 for reducing undesirable nitrous oxides (NOx) carried in exhaust gasses before discharging the gasses to the atmosphere. The automotive exhaust aftertreatment system 10 includes a DEF reservoir 46 holding urea-water solution, an ammonia creation and conversion unit 14, and a catalytic NOx reduction unit 12. The ammonia creation and conversion unit 14 is configured to convert the urea-water solution into aqueous ammonium carbamate solution. The catalytic NOx reduction unit 12 is configured inject either urea-water solution from the DEF reservoir 46 or aqueous ammonium carbamate solution from the ammonia creation and conversion unit 14 into engine exhaust. The mixture of these reductant fluids with exhaust gas converts NOx in the engine exhaust gas into nitrogen and water vapor or carbon dioxides which are released into the surrounding air.

The catalytic NOx reduction unit 12 includes a doser unit 18 and a plurality of sensors 20 as shown in FIGS. 2 and 3. The doser unit 18 is coupled to an outer casing of the automotive exhaust aftertreatment system 10 and is configured to discharge amounts of either urea-water solution, also known was diesel emission fluid (DEF), and/or aqueous ammonium carbamate solution into the engine exhaust stream moving through the exhaust aftertreatment system 10 as suggested in FIG. 2. The plurality of sensors 20 are coupled to the outer casing of the automotive exhaust aftertreament system 10 and extend into the exhaust stream. The sensors 20 are configured to measure either the temperature, pressure, nitrous oxide (NOx) levels, and/or the ammonia (NH3) levels of the untreated exhaust entering the system 10 and the treated exhaust exiting the system 10. In the illustrative embodiment, the hybrid heating system 16 is integrated into the doser unit 18 and manages temperatures within the doser unit 18.

The doser unit 18 includes a first doser 22, a second doser 23, and a doser controller 24 as shown in FIGS. 2 and 3. The first doser 22 is configured to discharge controlled amounts of urea-water solution (sometimes called diesel emission fluid or DEF) into the exhaust stream moving through the exhaust gas aftertreatment system 10. The second doser 23 is configured to discharge aqueous ammonium carbamate solution into the exhaust stream moving through the exhaust gas aftertreatment system 10. In other embodiments, a single doser is configured to switch between dosing urea-water solution and aqueous ammonium carbamate solution. The doser controller 24 controls the dosers 22,23 and is configured to feed urea-water solution and/or aqueous ammonium carbamate solution into the exhaust based on temperature data, back pressure data, NOx data (amount or conversion), or ammonia (NH3) data (amount) provided by the sensors 20.

The plurality of sensors 20 include temperature sensors 26, 28, pressure sensors 30, 32, nitrous oxide sensors 34, 36, and an ammonia sensor 37 as shown in FIG. 3. The temperature sensors 26, 28 are located in (meaning within or along) the exhaust stream and in communication with the doser controller 24 to provide measurements used in generating the temperature data. The pressure sensors 30, 32 are located in the exhaust stream and in communication with the doser controller 24 to provide measurements used in generating the back pressure data. The nitrous oxide sensors 34, 36 or NOx sensors 34, 36 are located in the exhaust stream and in communication with the doser controller 24 to provide measurements used in generating the NOx conversion data. The ammonia sensor 37 is located in the exhaust stream and in communication with the doser controller 24 to provide measurements used in generating the NH3 data.

In the illustrative embodiment, the temperature sensors 26, 28 include an upstream temperature sensor 26 and a downstream temperature sensor 28 as shown in FIG. 3. The upstream temperature sensor 26 (also referred to as the first temperature sensor) is located upstream of the doser unit 18 within the exhaust stream and is configured to measure the temperature of the untreated exhaust stream which is the exhaust stream entering the exhaust aftertreament system 10. The downstream temperature sensor 28 (also referred to as the second temperature sensor) is located downstream of the doser unit 18 within the exhaust stream and is configured to measure the temperature of the treated exhaust stream which is the exhaust stream exiting the exhaust aftertreatment system 10. In some embodiments, the downstream temperature sensor 28 may be located downstream of the doser unit 18 and before a selective catalytic reduction system 40 of the catalytic NOx reduction unit 12. In other embodiments, the temperature sensors 26, 28 may be located in other suitable areas of the engine or system 10 to provide measurements used in generating the temperature data.

In the illustrative embodiment, the pressure sensors 30, 32 include an upstream pressure sensor 30 and a downstream pressure sensor 32. The upstream pressure sensor 30 (also referred to as the first pressure sensor) is located upstream of the doser unit 18 within the exhaust stream and configured to measure the pressure within the exhaust aftertreatment system 10 before the exhaust is treated. The downstream pressure sensor 32 (also referred to as the second pressure sensor) is located downstream of the doser unit 18 within the exhaust stream and is configured to measure the pressure within the exhaust aftertreatment system 10 after the exhaust is treated. In some embodiments, the downstream pressure sensor 32 may be located downstream of the doser unit 18 and before the selective catalytic reduction system 40 of the catalytic NOx reduction unit 12.

The back pressure data is determined by calculating the difference in pressure measured by the upstream and downstream pressure sensors 30, 32. The back pressure is an indicator of deposit accumulation in the aftertreatment system 10 as well as low conversion efficiency, as deposit build up occurs when the system 10 is not converting the NOx in the exhaust to ammonia.

In the illustrative embodiment, the NOx sensors 34, 36 include an upstream NOx sensor 34 and a downstream NOx sensor 36. The upstream NOx sensor 34 (also referred to as the first NOx sensor) is located upstream of the doser unit 18 within the exhaust stream and is configured to measure the NOx level in the exhaust stream entering the aftertreatment system 10. The downstream NOx sensor 36 (also referred to as the second NOx sensor) is located downstream of the doser unit 18 within the exhaust stream and is configured to measure the NOx level in the exhaust stream exiting the aftertreatment system.

The NOx conversion data is determined by calculating the difference in the level of NOx entering the system 10 versus the level of NOx exiting the system 10. The NOx conversion data is an indicator of a low conversion efficiency in the system 10. In some embodiments, the downstream NOx sensor 36 may be located downstream of the doser unit 18 and before the selective catalytic reduction system 40 of the catalytic NOx reduction unit 12. In other embodiments, the downstream NOx sensor is located downstream of a catalyst 44 within the selective catalytic reduction system 40.

In the illustrative embodiment, the NH3 sensor 37 is located downstream of the doser unit 18 within the exhaust stream as shown in FIG. 3. The downstream NH3 sensor is configured to measure the NH3 level in the exhaust stream exiting the selective catalytic reduction system 40 of the aftertreatment system 10.

The NH3 data is determined by measuring the NH3 levels in the exhaust after the exhaust has been dosed by the doser 22, 23 and has exited the selective catalytic reduction system 40. The NH3 data is an indicator of low conversion efficiency in the system 10. A high level of NH3 indicates an accumulation of ammonia slip, which is result of deposit accumulation in a mixer 38 and/or the selective catalytic reduction system 40 from dosing urea-water solution at undesired conditions. The NH3 sensor 37 measures the level of NH3 thus determining the amount of ammonia slip in the system 10.

The doser controller 24 is configured to feed urea-water solution and/or aqueous ammonium carbamate solution into the exhaust stream moving through the exhaust aftertreatment system 10 based on temperature data, back pressure data, or NOx level data determined from the plurality of sensors 20 to optimize the dosing of the exhaust in the aftertreatment system 10. For instance, under continued low temperature operation, aqueous ammonium carbamate solution reserves can run out, as there is the temperature of the exhaust is not hot enough to generate more aqueous ammonium carbamate. If the aqueous ammonium carbamate reserves are low, then the doser controller 24 can switch to feeding urea-water solution in a temperature window where the temperature of the exhaust is high enough that the urea-water solution can generate ammonia, but lower than the normal deposit related temperature threshold that results in deposit accumulation. Conversely, under continued dosing of urea-water solution at unsuitable temperatures, deposit accumulation may occur, which results in a high back pressure or high levels of NOx. If there is back pressure or high levels of NOx, then the doser controller 24 can switch back to feeding aqueous ammonium carbamate solution into the exhaust.

In the illustrative embodiments, the doser controller 24 is configured to feed only aqueous ammonium carbamate solution when the temperature data is below a predetermined first temperature threshold and the back pressure data is above a predetermined pressure threshold. In this case, the temperature of the exhaust is too low to inject urea-water solution to generate ammonia and there are high amounts of deposit accumulation. As such, the doser controller 24 feeds aqueous ammonium carbamate solution to the doser 23 to inject the aqueous ammonium carbamate solution into the exhaust stream.

In the illustrative embodiments, the doser controller 24 is also configured to feed only urea-water solution when the temperature data is below the first predetermined temperature threshold, above a second predetermined temperature threshold, and the back pressure data is below the predetermined pressure threshold. In this case, the temperature of the exhaust is high enough for the urea-water solution to generate some ammonia, but still too low that deposits accumulation will occur. However, the back pressure data shows little to no deposit accumulation, and the system 10 can withstand some deposit buildup. As such, the doser controller 24 feeds urea-water solution to the doser 22 to inject the urea-water solution into the exhaust stream.

In other embodiments, the doser controller 24 is configured to feed only urea-water solution when the temperature data is above the predetermined first temperature threshold. In this case, the temperature of the exhaust is high enough the for the urea-water solution to generate ammonia without any deposit accumulation and the system 10 is hot enough for the ammonia creation and conversion unit 14 to generate more aqueous ammonium carbamate solution to accumulate some reserves. As such, the doser controller 24 feeds urea-water solution to the doser 22 to inject the urea-water solution into the exhaust stream.

In the illustrative embodiment, the doser controller 24 is further configured to feed only aqueous ammonium carbamate solution into the exhaust stream moving through the aftertreatment system 10 when the NOx conversion data is above a predetermined first NOx threshold. In this case, the NOx level of the exhaust exiting the system 10 is too high when compared to the NOx levels of the exhaust entering the system 10, indicating a low conversion efficiency. Thus, the doser controller 24 is configured to inject aqueous ammonium carbamate solution at a predetermined reaction flow rate into the exhaust stream based at least in part on the amount of NOx detected. The doser controller 24 is further configured to inject aqueous ammonium carbamate solution at a relief flow rate into the exhaust stream greater than the predetermined reaction flow rate when the amount of aqueous ammonium carbamate solution in an ammonium carbamate reservoir 52 included in the ammonia creation and conversion unit 14 is greater than a predetermined amount.

In some embodiments, the doser controller is configured to feed only aqueous ammonium carbamate solution into the exhaust stream moving through the aftertreatment system 10 when the temperature data is below the predetermined first temperature threshold and the NOx conversion data is above the predetermined first NOx threshold. In some embodiments, a large mixer may be included in the catalytic NOx reduction unit 12. The large mixer may cause delays in pressure sensing and thus delays in generating back pressure data. In this instance, the NOx conversion data is used to determine the deposit accumulation in the system 10 based on the amount of NOx remaining after the treatment of the exhaust. If the temperature data is below the threshold and the NOx conversion data is above the threshold, then the temperature is not hot enough to generate ammonia from uera-water solution and the system 10 is experiencing high deposit accumulation. As such, the doser controller 24 feeds aqueous ammonium carbamate solution to the doser 23 to inject the aqueous ammonium carbamate solution into the exhaust stream.

In some embodiments, the doser controller is configured to feed only urea-water solution into the exhaust stream moving through the aftertreatment system 10 when the temperature data is below the predetermined first temperature threshold, above a second temperature threshold, and the NOx conversion data is below the predetermined first NOx threshold. In this case, the temperature of the exhaust is high enough for the urea-water solution to generate some ammonia, but still too low that deposits accumulation will occur. However, the NOx conversion data shows little to no deposit accumulation since there are low levels of NOx in the exhaust exiting the system, and thus the system 10 can withstand some deposit buildup. As such, the doser controller 24 feeds urea-water solution to the doser 23 to inject the aqueous ammonium carbamate solution into the exhaust stream.

In some embodiments, the configured to feed only aqueous ammonium carbamate solution into the exhaust stream moving through the aftertreatment system 10 when the NH3 data is above a predetermined first ammonia threshold. In this case, the amount of NH3 present in the exhaust is too high after being reacted in the selective cayalytic reduction system 40. As such, the doser controller 24 feeds aqueous ammonium carbamate solution to the doser 23 to inject the aqueous ammonium carbamate solution into the exhaust stream.

In some embodiments, the configured to feed only aqueous ammonium carbamate solution into the exhaust stream moving through the aftertreatment system 10 when the NH3 data is above a predetermined first ammonia threshold and the back pressure data is above the predetermined pressure threshold. In this case, the NH3 levels are too high, resulting in accumulation of ammonia slip. The back pressure data confirms that there are high amounts of deposit accumulation causing the accumulation of ammonia slip to form. As such, the doser controller 24 feeds aqueous ammonium carbamate solution to the doser 23 to inject the aqueous ammonium carbamate solution into the exhaust stream.

Turning again to the catalytic NOx reduction unit 12 shown in FIG. 2, the catalytic NOx reduction unit 12 further includes a mixer 38, the selective catalytic reduction system 40, and an ammonia slip catalyst system 42 as shown in FIG. 2. The mixer 38 is mounted within the system 10 and is configured to mix the engine exhaust with the fluid injected by the doser unit 18. The selective catalytic reduction system 40 is configured to selectively convert the exhaust-diesel emission fluid mixture comprising nitrogen oxides with the aid of a catalyst 44 into either nitrogen and water vapor or carbon dioxide. The reaction product is nitrogen and water vapor when diesel emission fluid is mixed with the exhaust and the reaction product is carbon dioxide when ammonia is mixed with the exhaust. The ammonia slip catalyst system 42 is configured to further convert any partially oxidized nitrogen oxides exiting the selective catalytic reduction system 40.

The catalytic NOx reduction unit 12 shown in FIG. 2 further includes a diesel emission fluid reservoir 46 and a diesel-doser pump 48 as shown in FIG. 2. The diesel emission fluid reservoir 46 is in communication with a ammonium carbamate reactor 50 and the doser unit 18. The diesel-doser pump 48 is coupled to the diesel emission fluid reservoir 46 and is configured to pump diesel emission fluid to the doser unit 18.

The ammonia creation and conversion unit 14 includes an ammonium carbamate reactor 50 and an ammonium carbamate reservoir 52. The ammonium carbamate reactor 50 is coupled to a diesel emission fluid reservoir 46 included in the catalytic NOx reduction unit 12 and is configured to generate aqueous ammonium carbamate solution from diesel emission fluid. The ammonium carbamate reservoir 52 is coupled to the ammonium carbamate reactor 50 and is used for storing generated aqueous ammonium carbamate solution from the ammonium carbamate reactor 50.

The hybrid heating system 16 may be further configured to manage temperatures within other parts of the automotive exhaust aftertreatment system 10 as suggested in FIGS. 1 and 2. Specifically, the hybrid heating system 16 may be configured to manage temperatures within the ammonium carbamate reactor 50, the ammonium carbamate reservoir 52, and the dosing unit 18.

The hybrid heating system 16 includes passive and active heating elements, a heating system controller 54, and a plurality of sensors 56 as shown in FIGS. 1 and 2. The heating system controller 54 is configured to selectively apply heat from the active heating elements to manage the temperature within the system 10. The heating system controller 54 is also configured to selectively modulate heat from the passive heating elements to control the temperature within the system 10. The heating system controller 54 is configured to selectively apply heat from the active heating elements and selectively modulate heat from passive heating elements based on information such as temperature and tank level measured by the plurality of sensors 56.

In the illustrative embodiment, the plurality of sensors 56 includes reactor temperature sensor 58, a reservoir temperature sensor 60, a reactor level sensor 62, and a reservoir level sensor 64 as shown in FIGS. 2 and 3. The reactor temperature sensor 58 is coupled to the ammonium carbamate reactor 50 and is configured to measure the temperature of the contents in the ammonium carbamate reactor 50. The reactor level sensor 62 is coupled to the ammonium carbamate reactor 50 and configured to measure the amount of fluid in the reactor 50. Additionally, reservoir temperature sensor 60 and the reservoir level sensor 64 are coupled to the ammonium carbamate reservoir 52. The reservoir temperature sensor 60 measures the temperature of the contents stored in the reservoir 52. The reservoir level sensor 64 determines the levels of aqueous ammonium carbamate solution stored in the reservoir 52. The plurality of sensors 56 are in communication with the heating system controller 54.

The exhaust aftertreatment system 10 further includes an integrated hybrid heating system 16 for managing component/fluid temperatures within the system as shown in FIG. 2. The hybrid heating system 16 includes a passive doser heat exchanger 66 and an active doser heating element 68 as shown in FIG. 3. The passive doser heat exchanger 66 is configured to withdraw heat from exhaust gasses passing through the exhaust aftertreatment system 10 and heat passageways through the doser 23. The active doser heating element 68 is configured to produce heat from electrical energy supplied to the heating system 16 and heat passageways through the doser unit 18. The heating system controller 54 is configured to selectively apply heat from the active doser heating element 68 as to manage the temperature of aqueous ammonium carbamate solution moving in passageways through the doser unit 18. The heating system controller 54 is also configured to selectively modulate heat from the passive doser heat exchanger 66 as to manage the temperature of aqueous ammonium carbamate solution moving in passageways through the doser unit 18. Additionally, the heating system controller 54 is configured to selectively apply heat from the active doser heating element 68 and to selectively modulate heat from the passive doser heat exchanger 66 so as to manage the temperature of aqueous ammonium carbamate solution discharged from the doser 23 at or above 60 degrees Celsius. In some embodiments, the heating system controller 54 is configured to selectively apply heat from the active doser heating element 68 and to selectively modulate heat from the passive doser heat exchanger 66 so as to manage the temperature of aqueous ammonium carbamate solution discharged from the doser 23 between about 60 degrees Celsius and about 200 degrees Celsius.

The hybrid heating system 16 may also include a passive reactor heat exchanger 70 and an active reactor heating element 72. The passive reactor heat exchanger 70 is configured to withdraw heat from exhaust gasses passing through the exhaust aftertreatment system 10 and heat contents of the ammonium carbamate reactor 50. The active reactor heating element 72 is configured to produce heat from electrical energy supplied to the heating system 16 and heat contents of the ammonium carbamate reactor 50. The heating system controller 54 is electrically coupled to both active and passive heating elements 70, 72. The heating system controller 54 is also configured to selectively apply heat from the active reactor heating element 72 to manage the temperature within the ammonium carbamate reactor 50. The heating system controller 54 is also configured to selectively modulate heat from the passive reactor heat exchanger 70 to control the temperature within the ammonium carbamate reactor 50.

The hybrid heating system 16 also includes a passive reservoir heat exchanger 74 and an active reservoir heating element 76. The passive reservoir heat exchanger 74 is configured to withdraw heat from exhaust gasses passing through the exhaust aftertreatment system 10 and heat contents of the ammonium carbamate reservoir 52. The active reservoir heating element 76 is configured to produce heat from electrical energy supplied to the heating system 16 and heat contents of the ammonium carbamate reservoir 52. The heating system controller 54 is configured to selectively apply heat from the active reservoir heating element 76 to manage the temperature within the ammonium carbamate reservoir 52 to maintain equilibrium of stored aqueous ammonium carbamate solution. The heating system controller 54 is also configured to selectively modulate heat from the passive reservoir heat exchanger 74 to control the temperature within the ammonium carbamate reservoir 52 to maintain equilibrium of stored aqueous ammonium carbamate solution.

The heating system controller 54 is configured to selectively apply heat from the active heating elements 68, 72, 76 and selectively modulate the heat from the passive heat exchangers 66, 70, 74 based on several factors. For example, the heating system controller 54 selectively applies heat from the active reactor heating element 72 based on information associated with tank level within the ammonium carbamate reservoir 52 received from sensors 56 in communication with the heating system controller 54. The heating system controller 54 applies heat from the active reactor heating element 72 when the contents of the ammonium carbamate reservoir 52 is running low and the passive reactor heat exchanger 70 is not generating enough heat to produce more aqueous ammonium carbamate solution.

The heating system controller 54 may also selectively apply heat from the active reactor heating element 72 based on information associated with the temperature within the reactor 50. The heating system controller 54 applies heat from the heating element 72 when the passive heating element 70 does not supply enough heat to react the contents of the reactor 50 to produce aqueous ammonium carbamate soltuion.

In other embodiments, the heating system controller 54 selectively applies heat from the active reservoir heating element 78 based on information associated with the temperature within the ammonium carbamate reservoir 52. The heating system controller 54 applies heat from the active reservoir heating element 78 when the temperature of the reservoir 52 is getting below a desired temperature as to maintain the equilibrium of the aqueous ammonium carbamate solution stored in the reservoir 52. If the passive reservoir heat exchanger 74 is not supplying enough heat to maintain the reservoir 52 at the desired temperature, the aqueous ammonium carbamate solution may form a precipitant or a solid. The heating system controller 54 applies head from the active reservoir heating element 78 in an instance where the temperature is low enough the precipitant or the solid would form.

In another embodiment, the heating system controller 54 applies heat from the active doser heating element 68 to maintain the desired temperature within the doser unit 18. If the desired temperature is not maintained within the doser unit 18, then the percipient or the solid may form in the doser unit 18 causing blockage.

The heating system controller 54 also selectively modulates the heat from the passive reactor heat exchanger 70 to control the temperature within the ammonium carbamate reactor 50. The heating system controller 54 modulates the heat from the passive reactor heat exchanger 70 when the temperature within the reactor 50 rises above the desired temperature.

The heating system controller 54 also selectively modulates the heat from the passive reservoir heat exchanger 74 to control the temperature within the ammonium carbamate reservoir 52. The heating system controller 54 modulates the heat from the passive reservoir heat exchanger 74 when the temperature within the reservoir 52 rises above the desired temperature. Lastly, the heating system controller 54 also modulates the heat from the passive doser heat exchanger 66 when the temperature within the doser unit 18 rises above the desire temperature.

In the illustrative embodiment, the hybrid heating system 16 also includes a battery 80 as shown in FIG. 2. The battery 80 is coupled to the active reactor heating element 72 and provides a power source for the active reactor heating element 72. The battery 80 may also be coupled to the active reservoir heating element 76 and the active doser heating element 68 and provides the power source for the active reservoir heating element 76 and the active doser heating element 68. In some embodiments, the hybrid heating system 16 instead includes at least one of a solar panel or a wind turbine that provides the power source for the active heating elements 68, 72, 76.

In the illustrative embodiment, the automotive exhaust after treatment system 10 further includes a catalyst 44. The catalyst 44 is mounted within the system 10. The passive reactor heat exchanger 70 withdraws heat from the exhaust gases downstream of the catalyst 44 so as not to reduce exhaust gas temperatures before interaction with the catalyst 44.

In the illustrative embodiment, the ammonium carbamate reactor 50 included in the ammonia creation and conversion unit 14 also includes a check valve 82 and a relief valve 84 as shown in FIGS. 2. The check valve 82 is in communication with the ammonium carbamate reservoir 52 and is configured to allow the aqueous ammonium carbamate solution generated by the reactor 50 to exit the reactor 50, but prevent any fluid from re-entering the reactor 50. The relief valve 84 is in communication with the diesel emission fluid reservoir 46 and is configure to allow the removal of diesel emission fluid from the reactor 50 if the pressure within the ammonium carbamate reactor 50 exceeds a desired pressure.

The ammonia creation and conversion unit 14 further includes a ammonium-doser pump 86 and a diesel-reactor pump 88 as shown in FIG. 2. The ammonium-doser pump 86 is coupled to the ammonium carbamate reservoir 52 and is configured to pump aqueous ammonium carbamate solution to the second doser 23. The diesel-reactor pump 88 is coupled to the diesel emission fluid reservoir 46 and is configured to pump diesel emission fluid to the ammonium carbamate reactor 50. In some embodiments, only one pump may be included in the system 10 and in communication with the ammonium carbamate reactor 50, the ammonium carbamate reservoir 52, the diesel emission fluid reservoir 46, and the doser unit 18 to pump the desired contents to the desired location.

The present disclosure introduces a method for reducing NOx emissions at low temperatures, such as engine start up, or low load engine duty cycles at temperatures less than 180 degrees Celsius by adding an ammonium carbamate solution to engine exhaust entering an exhaust aftertreatment system. However, the ammonium carbamate solution can precipitate at temperatures less than 20 degrees Celsius and cause undesirable effects in the exhaust aftertreatment system. In some embodiments, a doser may be added to the exhaust aftertreatment system to inject or dose the ammonium carbamate solution into the engine exhaust flow. The doser may be heated by a heating system to ensure the ammonium carbamate solution has a temperature that remains above 20 degrees Celsius which prevents the precipitant from forming.

In some embodiments, the exhaust aftertreatment system includes a diesel emission fluid tank, an ammonium carbamate reactor, pumps, valves, a controller, and an ammonium carbamate tank. The exhaust aftertreatment system may be used to meet the Ultra Low NOx emissions of 0.002 g hp-hr proposed for 2023 by the California Air Resources Board. In addition to commercial vehicle applications, the exhaust aftertreatment system 10 can be implemented in passenger car or high horse performance car markets. While the illustrative embodiment shows the system including a number of pumps, fewer or even a single pump may be included in the system to drive fluid flow without departing from the contemplated designs.

The present disclosure introduces using heated dosing for an ammonium carbamate reductant fluid. Ammonium carbamate works well as the NOx reductant at surface temperatures below 150 degrees Celsius. The heated doser or injector may be electrically heated or heated with exhaust. The heated doser reduces ammonium carbamate droplets even more and can aid in the mixing of the exhaust and the ammonium carbamate solution in a mixer of the exhaust aftertreatment system. The amount of aqueous ammonium carbamate solution injected by the heated doser depends on the amount of NOx to be reduced in the exhaust. The amount of aqueous ammonium carbamate solution added may be regulated by NOx sensors and a controller. The overall exhaust aftertreatment system would allow exhaust to meet the California Air Resources Board standards as well as the European and China future standards.

The following numbered clauses include embodiments that are contemplated and non-limiting:

Clause 1: An exhaust aftertreatment system for use with a diesel combustion engine, the system comprising a diesel emission fluid reservoir holding a urea-water solution, a reactor for generating aqueous ammonia solution from diesel emission fluid in the diesel emission fluid reservoir, a doser unit configured to discharge controlled amounts of either urea-water solution and/or aqueous ammonia solution into an exhaust stream moving through the exhaust gas aftertreatment system, the doser unit including a doser controller configured to feed urea-water solution and/or aqueous ammonia solution based on temperature data and/or on back pressure data, wherein the doser controller is configured to feed only aqueous ammonia solution when the temperature data is below a predetermined first temperature threshold and/or the back pressure data is above a predetermined pressure threshold.

Clause 2: The system of any other suitable clause or combination of clauses, wherein the doser controller is configured to feed only urea-water solution when the temperature data is below the predetermined first temperature threshold and the back pressure data is below the predetermined pressure threshold.

Clause 3: The system of any other suitable clause or combination or clauses, wherein the doser controller is configured to feed only urea-water solution when the temperature data is above the predetermined first temperature threshold.

Clause 4: The system of any other suitable clause or combination or clauses, further comprising a first pressure sensor and a second pressure sensor each located within the exhaust stream and in communication with the doser controller to provide measurements used in generating the back pressure data, wherein the first pressure sensor is located upstream of the doser unit within the exhaust stream, and the second pressure sensor is located downstream of the doser unit within the exhaust stream.

Clause 5: The system of any other suitable clause or combination or clauses, further comprising a selective catalytic reduction unit with a catalyst mounted in the exhaust stream, wherein the second pressure sensor is located downstream of the catalyst.

Clause 6: The system of any other suitable clause or combination or clauses, further comprising a first temperature sensor in communication with the doser controller to provide measurements used in generating the temperature data.

Clause 7: An exhaust aftertreatment system for use with a diesel combustion engine, the system comprising a diesel emission fluid reservoir holding a urea-water solution, a reactor for generating aqueous ammonia solution from diesel emission fluid in the diesel emission fluid reservoir, a doser unit configured to discharge controlled amounts of either urea-water solution and/or aqueous ammonia solution into an exhaust stream moving through the exhaust gas aftertreatment system, the doser unit including a doser controller configured to feed urea-water solution or aqueous ammonia solution based on nitrous oxide conversion data, wherein the doser controller is configured to feed only aqueous ammonia solution when the nitrous oxide conversion data is above a predetermined first NOx threshold.

Clause 8: The system of any other suitable clause or combination or clauses, further comprising a first nitrous oxide sensor located within the exhaust stream and in communication with the doser controller to provide measurements used in generating the nitrous oxide conversion data.

Clause 9: The system of any other suitable clause or combination or clauses, further comprising a selective catalytic reduction unit with a catalyst mounted in the exhaust stream, wherein the first nitrous oxide sensor is located downstream of the catalyst.

Clause 10: The system of any other suitable clause or combination or clauses, further comprising a second nitrous oxide sensor located within the exhaust stream and in communication with the doser controller to provide measurements used in generating the nitrous oxide conversion data.

Clause 11: A vehicle comprising a combustion engine configured to generate exhaust gases, and an exhaust aftertreatment system configured to treat the exhaust gases, the system including a diesel emission fluid reservoir holding a urea-water solution, a reactor for generating aqueous an ammonia solution from diesel emission fluid in the diesel emission fluid reservoir, a doser unit configured to discharge controlled amounts of either urea-water solution and/or aqueous ammonia solution into an exhaust stream moving through the exhaust gas aftertreatment system, the doser unit including a doser controller configured to feed urea-water solution and/or aqueous ammonia solution based on temperature data and/or on back pressure data, wherein the doser controller is configured to feed only aqueous ammonia solution when the temperature data is below a predetermined first temperature threshold and/or the back pressure data is above a predetermined pressure threshold.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. An exhaust aftertreatment system for use with a diesel combustion engine, the system comprising:

a diesel emission fluid reservoir holding a urea-water solution, a reactor for generating an aqueous ammonia solution from diesel emission fluid in the diesel emission fluid reservoir, a doser unit configured to discharge controlled amounts of at least one of the urea-water solution and the aqueous ammonia solution into an exhaust stream moving through the exhaust gas aftertreatment system, the doser unit including a doser controller configured to feed the at least one of the urea-water solution and the aqueous ammonia solution based on at least one of temperature data and on back pressure data, wherein the doser controller is configured to feed only aqueous ammonia solution when the temperature data is below a predetermined first temperature threshold and the back pressure data is above a predetermined pressure threshold.

2. The system of claim 1, wherein the doser controller is configured to feed only the urea-water solution when the temperature data is below the predetermined first temperature threshold and the back pressure data is below the predetermined pressure threshold.

3. The system of claim 2, wherein the doser controller is configured to feed only the urea-water solution when the temperature data is above the predetermined first temperature threshold.

4. The system of claim 1, further comprising a first pressure sensor and a second pressure sensor each located within the exhaust stream and in communication with the doser controller to provide measurements used in generating the back pressure data, wherein the first pressure sensor is located upstream of the doser unit within the exhaust stream, and the second pressure sensor is located downstream of the doser unit within the exhaust stream.

5. The system of claim 4, further comprising a selective catalytic reduction unit with a catalyst mounted in the exhaust stream, wherein the second pressure sensor is located downstream of the catalyst.

6. The system of claim 1, further comprising a first temperature sensor in communication with the doser controller to provide measurements used in generating the temperature data.

7. The system of claim 1, wherein doser controller is configured to feed only the urea-water solution when the temperature data is below the predetermined first temperature threshold, above a predetermined second temperature threshold, and the back pressure data is below the predetermined pressure threshold.

8. The system of claim 1, wherein the doser controller is configured to feed only the urea-water solution into the exhaust stream when an amount of the aqueous ammonia solution in an ammonium carbamate reservoir included in the exhaust aftertreatment system is less than a predetermined amount.

9. The system of claim 1, wherein the doser controller is configured to feed only the aqueous ammonia solution at a predetermined reaction flow rate into the exhaust stream when the back pressure data is above the predetermined pressure threshold, the doser controller is configured to feed only the aqueous ammonia solution at a relief flow rate into the exhaust stream when an amount of the aqueous ammonia solution in an ammonium carbamate reservoir included in the exhaust aftertreatment system is greater than a predetermined amount, and the relief flow rate is greater than the predetermined reaction flow rate.

10. An exhaust aftertreatment system for use with a diesel combustion engine, the system comprising:
a diesel emission fluid reservoir holding a urea-water solution,
a reactor for generating aqueous ammonia solution from diesel emission fluid in the diesel emission fluid reservoir,
a doser unit configured to discharge controlled amounts of at least one of the urea-water solution and the aqueous ammonia solution into an exhaust stream moving through the exhaust gas aftertreatment system, the doser unit including a doser controller configured to feed the at least one of the urea-water solution and aqueous ammonia solution based on nitrous oxide conversion data, and
a first nitrous oxide sensor located within the exhaust stream and in communication with the doser controller to provide measurements used in generating the nitrous oxide conversion data, the first nitrous oxide sensor configured to measure the nitrous oxide levels in the exhaust stream,
wherein the doser controller is configured to feed only the aqueous ammonia solution when the nitrous oxide levels measured by the first nitrous oxide sensor is above a predetermined first NOx threshold.

11. The system of claim 10, further comprising a selective catalytic reduction unit with a catalyst mounted in the exhaust stream, wherein the first nitrous oxide sensor is located downstream of the catalyst.

12. The system of claim 11, further comprising a second nitrous oxide sensor located within the exhaust stream and in communication with the doser controller to provide measurements used in generating the nitrous oxide conversion data.

13. The system of claim 10, wherein the doser controller is configured to feed only the urea-water solution when the temperature data is below a predetermined first temperature threshold, above a predetermined second temperature threshold, and the nitrous oxide conversion dated is below the predetermined first NOx threshold.

14. The system of claim 10, wherein the doser controller is configured to feed only the aqueous ammonia solution at a predetermined reaction flow rate into the exhaust stream when the nitrous oxide conversion data is above the predetermined first NOx threshold, the doser controller is configured to feed only the aqueous ammonia solution at a relief flow rate into the exhaust stream when an amount of the aqueous ammonia solution in an ammonium carbamate reservoir included in the exhaust aftertreatment system is greater than a predetermined amount, and the relief flow rate is greater than the predetermined reaction flow rate.

15. A vehicle comprising:
a combustion engine configured to generate exhaust gases, and
an exhaust aftertreatment system configured to treat the exhaust gases, the system including
a diesel emission fluid reservoir holding a urea-water solution,
a reactor for generating an aqueous ammonia solution from diesel emission fluid in the diesel emission fluid reservoir,
a doser unit configured to discharge controlled amounts of at least one of the urea-water solution and the aqueous ammonia solution into an exhaust stream moving through the exhaust gas aftertreatment system, the doser unit including a doser controller configured to feed the at least one of the urea-water solution and aqueous ammonia solution based on at least one of temperature data and on back pressure data,
wherein the doser controller is configured to feed only aqueous ammonia solution when the temperature data is below a predetermined first temperature threshold and the back pressure data is above a predetermined pressure threshold.

* * * * *